May 8, 1934.  J. N. SMITH  1,958,398

LIQUID FEEDING DEVICE

Filed June 30, 1930  2 Sheets-Sheet 1

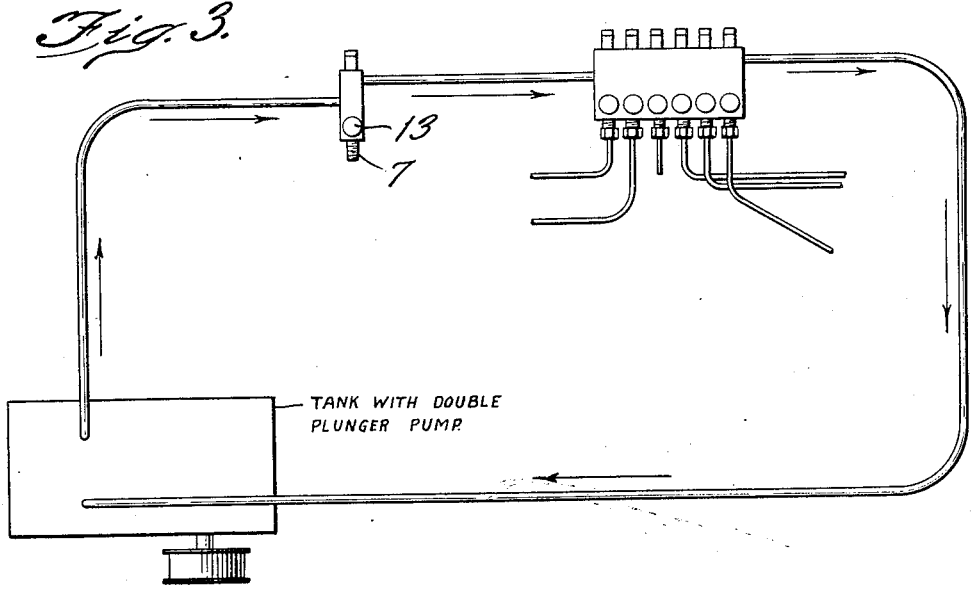
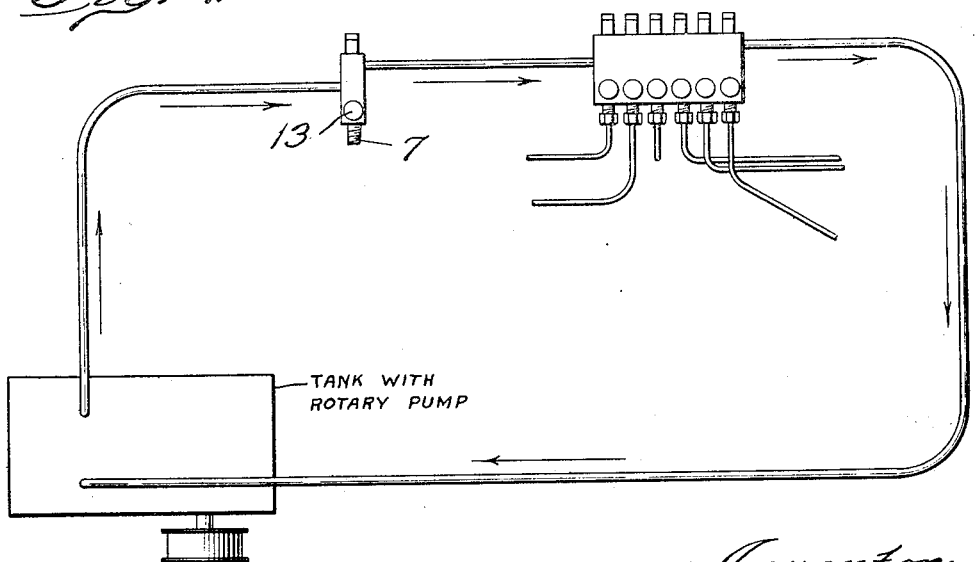

Patented May 8, 1934

1,958,398

UNITED STATES PATENT OFFICE 1,958,398

LIQUID FEEDING DEVICE

James N. Smith, Cleveland, Ohio, assignor to S. F. Bowser & Company, Inc., Fort Wayne, Ind., a corporation of Indiana Application June 30, 1930, Serial No. 464,768

11 Claims. (Cl. 184—7)

My invention relates to feeding devices adapted for use in liquid pressure systems, and one of the objects of my present invention is to provide an efficient device for delivering a predetermined small quantity of liquid over a long period of time.

Yet another object of my invention resides in the particular adaptation of my invention to the feeding of a relatively small quantity of lubricant to a bearing over a long period of time.

Another object of the invention is the provision of means for rotating the delivery valve of a lubricator to assure consistent discharge to the part to be lubricated.

A further object of the invention is the provision of means actuated by the flow of lubricant to prevent clogging of the delivery nozzle.

More particularly it is the object of the present invention to provide means within the lubricator rotated by the lubricant flowing through the lubricator to rotate a valve in a drip nozzle to prevent deposits from the lubricant clogging or unduly restricting the passage of the lubricant through the nozzle.

Other objects of the invention will appear hereinafter, the novel features and combinations being set forth in the appended claims.

My invention is thoroughly adaptable to any type of liquid feeding device wherein the liquid is caused to flow by means of pressure, but for purpose of illustration, but not by way of limitation, I have disclosed my invention as adapted to a lubricating system.

In the accompanying drawings—

Fig. 3 is a liquid circulating system showing the manner in which the device shown in Fig. 1 of the drawings is connected into a constant pressure, intermittent oil flow circuit, and Fig. 4 is a somewhat similar figure showing the manner in which the device is connected into a constant pressure, constant flow circuit.

Figure 1:
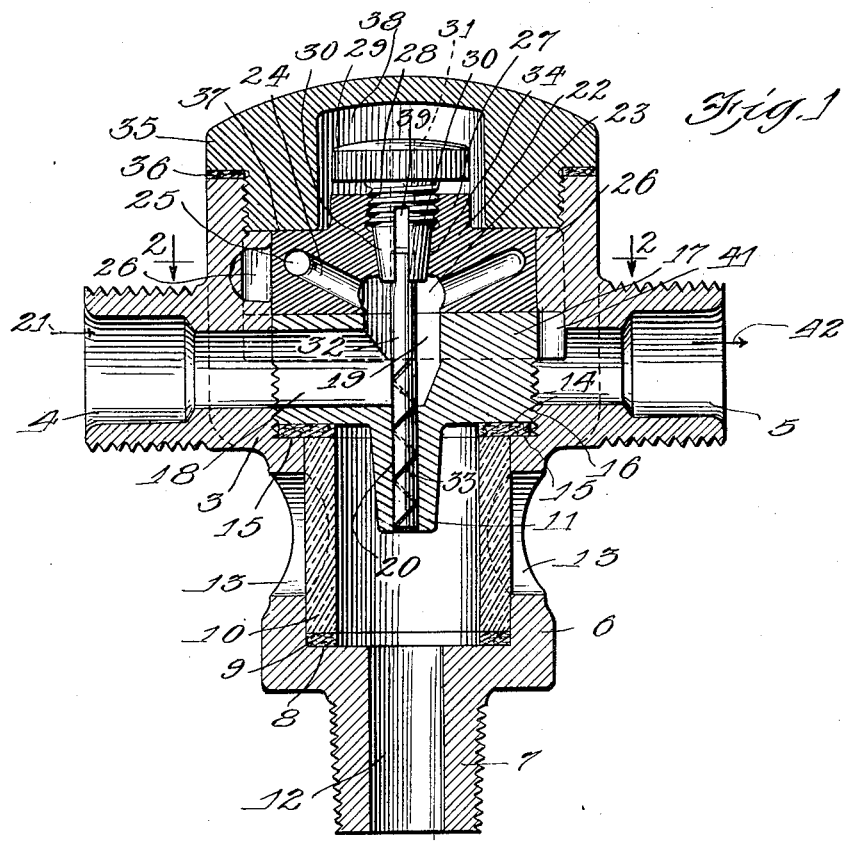
Fig. 1 is a sectional elevation of a lubricator embodying my improvements.

In Fig. 1, 3 designates the body having an inlet port 4 and an outlet port 5 in diametrical extensions screw threaded to receive pipes of a lubricating system. Depending from the body 3 is a cylindrical standard 6 having a screw-threaded extension 7 at its lower end adapted to be mounted on a part to be lubricated or connected to a pipe leading thereto.

Resting on an annular seat 8 in the cylinder 6 is a gasket 9 on which rests a glass cylinder 10. The lubricant drip nozzle 11 depends into the glass cylinder 10 so that the flow of the lubricant downwardly therefrom into the passageway 12 may be observed through the sight openings 13, 13 in opposite sides of the cylinder 6.

On top of the glass cylinder 10 is an annular gasket 14, the outer portion of which rests on the annular seat 15 in the body 3. Screw-threaded into the body 3 at 16 is a block 17 integral with which is the nozzle 11. That is to say, the nozzle 11 may be cast integrally with the block 17 which is screw threaded at 16 to the body 3 to clamp the gasket 14 against its seat 15 and against the top of the glass cylinder 10. It will thus be seen that the glass cylinder 10 is clamped against the gasket 9 on the seat 8.

The cylindrical block 17 is provided with a radial passageway 18 which communicates with a central vertical passageway 19 extending upwardly. The passageway 18 also communicates with the cylindrical opening 20 extending downwardly through the nozzle 11. When the block 17 is screwed into place against the gasket 14 the passageway 18 registers with the inlet port 4. It should be understood that when the block 17 is fitted in place within the body 3 the oil entering the port 4 as indicated by the arrow 21, can flow through the passageway 18 and then upwardly along the passage 19 and a certain predetermined quantity, as hereinafter explained, flows downwardly through the passage 20 in the nozzle 11.

Mounted above the block 17 on the upper circular plane face thereof, is a rotor 22 having a central recess 23 in the bottom thereof registering with the passageway 19 and communicating with the upwardly inclined radial passageways 24 in the rotor 22.

Figure 2:
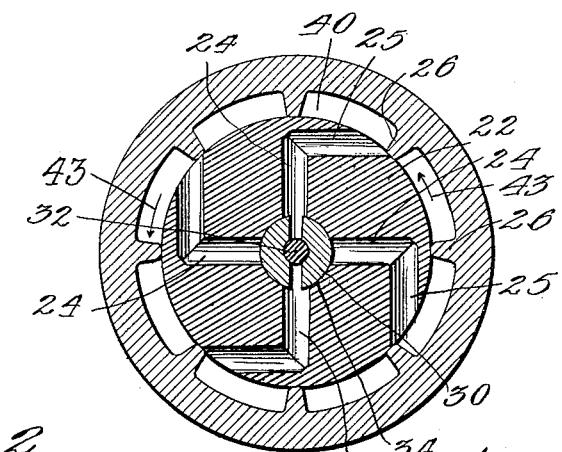
Fig. 2 is a sectional plan view taken on the line 2—2 of Fig. 1.

There may be any desired number of radial passageways 24. Fig. 2 which is a sectional plan view on the line 2—2 of Fig. 1, shows four such radial passageways connecting at right angles to the peripheral passageways 25. The outer cylindrical peripheral surface of the rotor 22 is adapted to engage the inwardly extending radial lugs or vanes 26 as shown in Fig. 2. These radial lugs also prevent rotation of the oil since such lugs extend over the entire height or thickness of the rotor as shown in Fig. 1.

Screw-threaded into the neck 27 of the rotor 22, is a clamp 28 operable manually by means of the knurled head 29 and provided with clamping jaws 30, 30.

Extending axially entirely through the clamp 28 is a cylindrical hole 31 for receiving the stem 32, the lower portion of which is provided on its periphery with a spiral groove 33. The outer surfaces of the clamping jaws 30, 30 are frusto-conical in shape and fit against a corresponding seat 34 in the center of the rotor 22 between the screw threads in the neck 27 and the recess 23 in the central bottom portion of the rotor 22. In assembling the lubricator the position of the stem 32 may be adjusted while the clamping jaws 30, 30 are released from the upper end and when the stem is in its desired adjusted position, the clamp may be applied to the upper end of the stem 32 by turning the knurled head 29.

After the stem 32 has been adjusted and clamped and the nozzle block 17 mounted in the body 3 to have its passageway 18 register with the inlet port 4 and the rotor has been mounted within the radial lugs 26, the cap or cover 35 may be screw-threaded into place against the gasket 36 and against the tops of the radial lugs 26, leaving sufficient clearance at the under annular bearing surface 37 for free rotation of the rotor 22. A recess 38 within the cap 35 affords ample space for the head 29 and also for the stem 32.

The stem 32 is preferably of such a length that when its lower end is at the lower end of the nozzle 11, the upper end may be securely gripped by the jaws 30. To increase the rate of discharge from the nozzle 11 the valve stem 32 may be lifted to various positions until its upper end abuts against the bottom of the cap 35 in the recess 38. To secure the maximum range of adjustment it is preferred to have the opening 31 extend entirely through the head 29.

The lubricator head shown may be used either in a constant pressure constant flow oil circuit as shown in Fig. 4 of the drawings, wherein a rotary pump is used as the liquid impelling means, or a constant pressure intermittent flow circuit as shown in Fig. 3, where a double plunger pump is used as the liquid impelling means, or otherwise. The oil enters at the inlet port 4 as indicated by the arrow 21 and flows through the passageway 18 into the recess 23 and thence into the plurality of upwardly inclined radial passageways 24 to the right angle extension passages 25, from which the oil emerges into the vertical chambers 40 between the inwardly extending radial lugs 26. From the chambers 40 the oil flows downwardly into the annular passageway 41 which surrounds the nozzle block 17 except at the inlet port 4. The passageway 41 communicates with the outlet port 5 from which the oil emerges as indicated by the arrow 42.

The flow of the oil through the rotor 22 will effect rotation thereof in a counter-clockwise direction as indicated by the arrow 43 in Fig. 2, and this will likewise effect rotation of the valve stem 32 and the spiral groove 33 in the lower portion thereof. It will thus be seen that the flow of the oil under pressure in the circulating system of which the inlet port 4 and outlet port 5 are parts, is not interrupted and the pressure on the oil will force a small quantity of the same through the spiral passageway 33 so as to drip from the nozzle 11. The length of the passageway 33 may be regulated in accordance with the pressure in the system, by changing the position of the stem 32 relative to the clamp 28. By having a spiral groove 33 of small depth and width a minute quantity of oil may be discharged from the nozzle 11 and this quantity may be varied according to the position of the stem 32 and the spiral groove 33 relative to the cylindrical opening 20 in the nozzle 11. The lower the stem 32 is placed in the opening 20 until its lower end registers with the lower end of the nozzle 11, the longer will be the path of travel of the oil from the chamber 18 to the emerging point from the groove 33 and therefore the greater the frictional resistance against the pressure of the oil in the system and the less the quantity of oil drip.

It has been difficult to regulate the flow of small quantities of oil for lubricating purposes on account of the accumulation of a deposit from the oil restricting the passageway to the delivery nozzle, but this difficulty is greatly minimized in my lubricator because of the rotation of the stem 32 and the spiral groove 33 therein. The rotor constantly rotates the stem 32 and its grooved portion constantly wipes against the walls of the cylindrical opening 20 and thus prevents clogging of the groove 33. It will thus be seen that the oil in its passage from the chamber 18 to the lower end of the spiral groove 33 is constantly agitated to prevent the tendency of deposit from the oil to clog the passageway 33 or restrict such passageway. Furthermore, if the lubricator is used in an intermittent flow lubricating circuit, any deposit from the oil within the passageway 33 clogging or restricting the same will be broken up by the operation of the rotor 22 and therefore the initial cross-sectional area of the passageway 33 will be automatically restored within a brief interval so that the desired regulation of the dripping of the oil from the nozzle 11 may be assured.

It should also be noted that the adjusting arrangement may also be used for varying the length of the constantly open passageway extending along the groove 33 between the chamber 18 and the lower end of the stem 32. The amount may be regulated by adjusting the elevation of the stem 32 and holding it stationary in adjusted position. The lower portion of the stem 32 will then act as a valve resting on the cylindrical valve seat 20 with a restricted passageway 33 of adjusted length extending along the valve seat between the chamber 18 and the lower end of the valve.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a lubricator, the combination with a support having an inlet port and an outlet port adapted to be connected to a circulating system, of a rotor within said support operable by the flow of fluid from said inlet port to said outlet port, a nozzle for dripping lubricant to a branch port of said support, a valve for said nozzle having a small groove to form with the inner wall of said nozzle a small passageway for effecting the dripping of very small quantities of lubricant to said branch support, and an adjustable clamping device carried by said rotor for regulating the effective length of such passageway and causing rotation to be imparted to said valve to keep such passageway open and free from lubricant deposit.

2. In a device of the class described, the combination of a conduit through which fluid is adapted to flow, means for forcing fluid under pressure, a branch discharge nozzle including means comprising a rotatable spirally grooved member positioned in the path of movement of said flowing fluid and adapted to be rotated thereby for controlling the rate of flow of fluid from said nozzle.

3. In a device of the class described, the combination of a means forming a constant pressure constant flow liquid circuit, of a feeding head having a passage therethrough, means for connecting said passage in series with said liquid circuit whereby liquid flowing under pressure in said circuit will be forced through said head, of a liquid feeding device connected with said circuit and adapted to be rotated by the flow of liquid through said head, said device having means for positively controlling the rate of flow of liquid from the flow-line passing through said nozzle.

4. In a device of the class described, means forming a constant pressure constant flow liquid circuit through which liquid under pressure is adapted to be forced, a head having a discharge nozzle and having an inlet and discharge connection adapted to be connected in series with said circuit whereby liquid under pressure is forced through said head, and means rotated by the flow of liquid through said head for controlling the rate of flow of predetermined quantities of liquid from said circuit flow through said nozzle.

5. In a device of the class described, the combination of means forming a fluid pressure intermittent flow circuit through which liquid under pressure is adapted to be forced, of a head having an inlet and discharge adapted to be connected in series in said circuit and having a second discharge, and through which liquid under pressure is adapted to be forced, said head having means rotated by the flow of liquid therethrough for controlling the rate of flow of predetermined quantities of liquid through said second discharge.

6. In a liquid feeding device, the combination of means forming a constant pressure liquid flow circuit through which liquid under pressure is adapted to be forced, of a feeding device adapted to be inserted in series in said circuit and through which liquid under pressure is adapted to be forced, said feeding device including a nozzle and a co-operating rotary feed member having a spirally arranged feeding groove for permitting the flow of liquid through said nozzle, said device having means actuated by the flow of liquid through said device whereby to cause rotation of said grooved member.

7. In a device of the class described, the combination of liquid feed circuit through which liquid is adapted to be forced under pressure, a feeding head connected in series in said circuit and through which said liquid is adapted to flow, said head having a hollow discharge nozzle, a relatively long pin rotatably mounted in said discharge nozzle and provided with a peripheral spiral groove, said head having an internal chamber connected with the inlet of said circuit, said chamber communicating with said spiral groove on said pin, said pin having operatively associated means adapted to be rotated by a movement of the liquid passing through said head for rotating said pin.

8. In combination with means forming a liquid feed circuit through which liquid under pressure is adapted to be forced, a feed head operatively associated with said circuit and comprising a base member having a discharge nozzle and having an inlet and an outlet, said inlet and outlet being adapted to be connected in series in said circuit, said base member having an internal chamber communicating with the inlet of said head, and a rotor provided with a plurality of radially extending grooves communicating with said chamber, said grooves terminating in angularly disposed conduits having their orifices opening onto the periphery of said rotor, said rotor and head having operatively associated means whereby liquid forced under pressure through said radially and angularly extending openings causes the rotation of said rotor, said rotor having a threaded opening, a locking nut in said opening, said locking nut having clamping jaws, an elongated pin rigidly clamped by said jaws and passing through said chamber with its outer end rotatably mounted in the nozzle of said base, said pin having a peripheral feed groove operatively associated with said nozzle whereby on rotation of said pin said feed groove causes the discharge of a predetermined quantity of liquid through said nozzle.

9. In a device of the class described, the combination of means forming a fluid circuit through which liquid under pressure is adapted to be forced, means associated with said circuit including a member forming a helically shaped liquid passage having its inlet connected with the fluid circuit and having its outlet adapted to discharge liquid from said circuit, and means operated by the liquid flowing through said circuit for rotating said member.

10. A feed head comprising a base provided with an inlet and having a discharge outlet, said base being provided with an internal chamber communicating with said inlet, said base also including a discharge nozzle communicating with said discharge outlet, a rotor turnably mounted within said base communicating with said inlet, said rotor having a plurality of radially disposed liquid passages having angularly disposed ends terminating at the periphery of said rotor, there being a space between the periphery of said rotor and said base providing liquid passages, said base having a plurality of vanes adapted to co-operate with said peripheral outlets, said rotor having a threaded aperture and a conical seat, a clamping device providing conically-shaped clamping jaws and a threaded portion adapted to screw onto the threaded seat, and a cylindrical pin adapted to be grasped by said clamping jaws and to be held rigidly thereby in adjusted position, said cylindrical pin having a helical peripheral feed groove adapted to co-operate with the inner bore of said discharge nozzle, said helical feed groove communicating with the inlet chamber of said base.

11. In a device of the class described, the combination of means forming a fluid circuit through which liquid is adapted to be forced under pressure, of a turnable member associated with said passage, said turnable member having means integrally and movably associated therewith for withdrawing liquid from said passage and for discharging said liquid from said passage, and said means having additional devices mounted thereon adapted to be actuated by the flow of fluid through said circuit for turning said means.

JAMES N. SMITH.